United States Patent Office 3,507,346
Patented Apr. 21, 1970

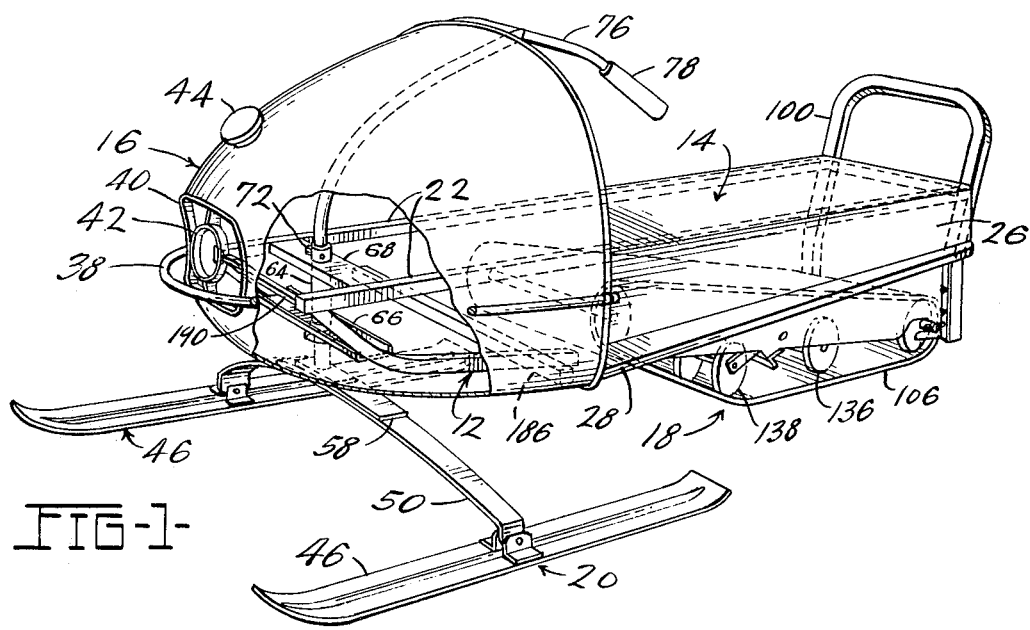
FIG-1-
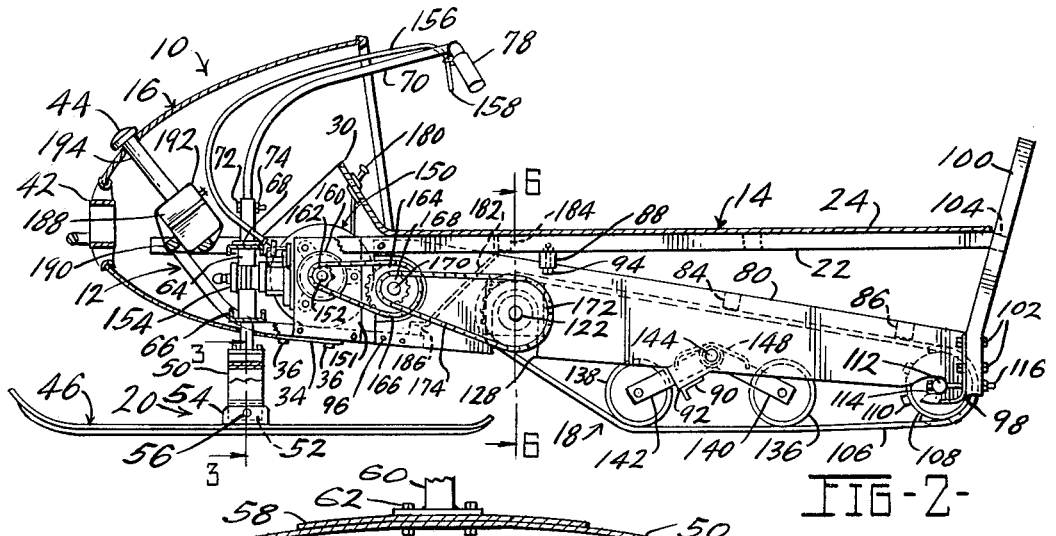
FIG-2-
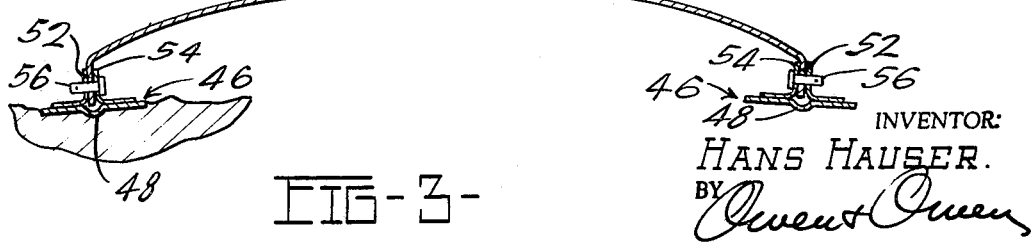
FIG-3-
INVENTOR:
HANS HAUSER.
BY Owen + Owen
ATT'YS.

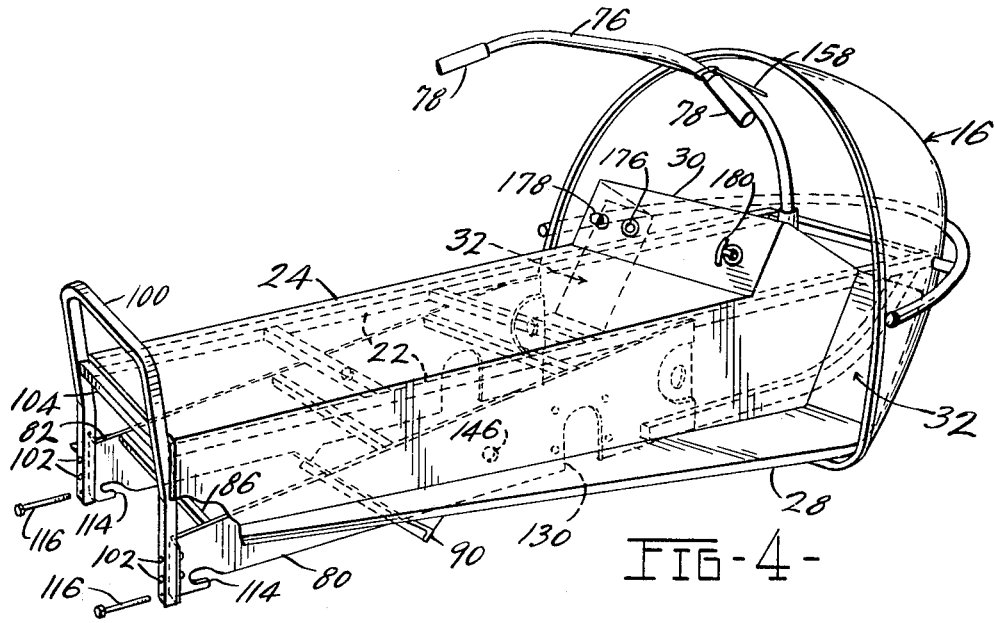
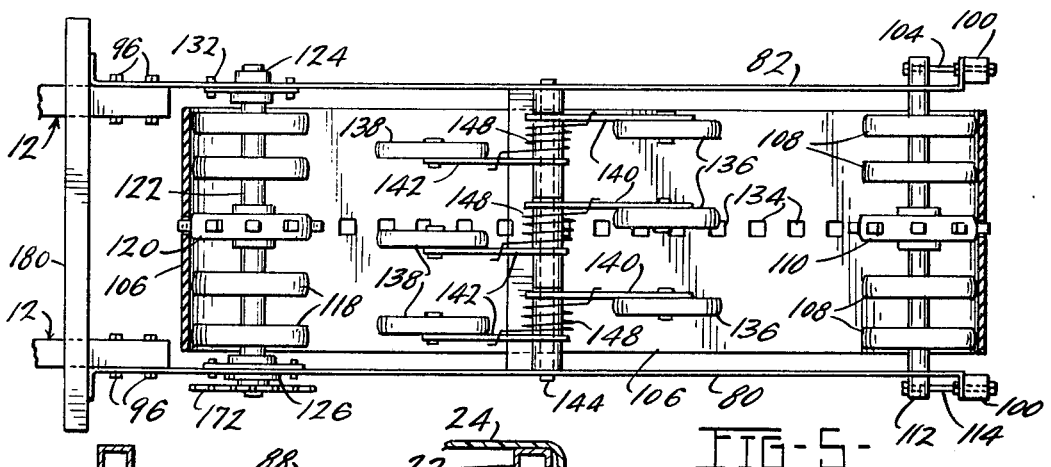
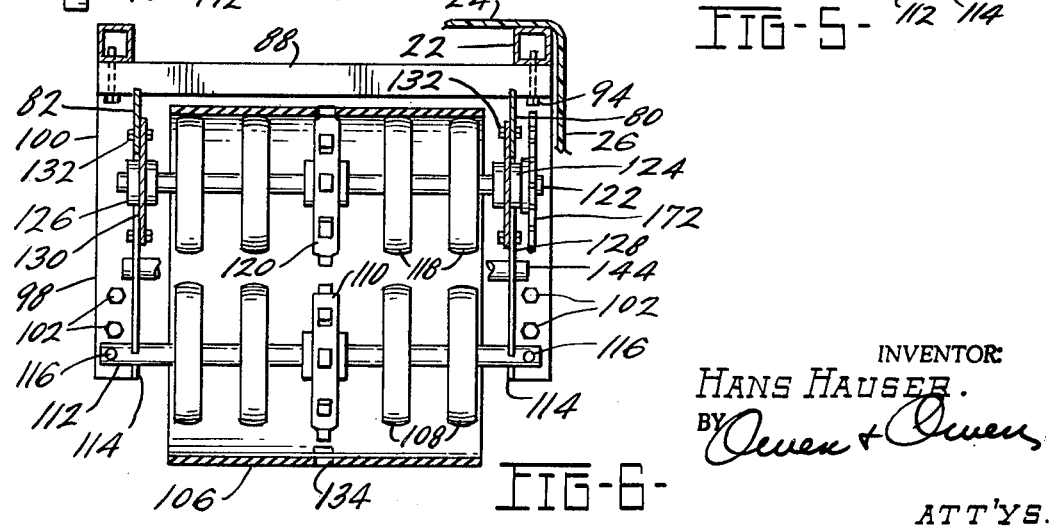

3,507,346
COMPACT SNOW VEHICLE
Hans Hauser, Fredericktown, Ohio, assignor to The J. B. Foote Foundry Co., Fredericktown, Ohio, a corporation of Ohio
Filed Apr. 29, 1968, Ser. No. 724,692
Int. Cl. B62m 27/02
U.S. Cl. 180—5                                                   5 Claims

ABSTRACT OF THE DISCLOSURE

A snow vehicle or snowmobile is provided which is especially designed for children and yet can still carry a fully grown man. The snowmobile is small, of a simple, relatively inexpensive design, and is intended to sell for a fraction of the cost of conventional snowmobiles so as to reach a wide market. The snow vehicle, the components of which are in a compact arrangement, features a unique ski structure and also a unique belt driving and supporting unit.

---

This invention relates to a snow vehicle and particularly a small snowmobile designed for children.

Many snow vehicles or snowmobiles are now known in the art and have reached a high degree of consumer acceptance. Such snowmobiles invariably are designed to carry at least two adults and are driven by engines up to fifteen horsepower and more, being capable of reaching speeds in the order of seventy miles per hour. Such snowmobiles are expensive and lack portability. Where the snowmobiles are carried from one location to another, they require special trailers which increase the already high costs of the vehicles.

The present invention relates to a small snowmobile designed specifically for children, although still being capable of carrying an adult, even up sizable hills. The snowmobile is of simple and low cost design and can be sold for less than half the selling price of even the less expensive snowmobiles generally now commercially available.

The snowmobile according to the invention features a unique supporting structure for the front skis which is of a simple and maintenance-free design, involving substantially only a resilient strap in the nature of a leaf spring for supporting and directing both skis. The ski support also is designed to enable the skis to be quickly removed, for decreasing the overall length of the vehicle and thereby increase the transportability thereof. Even with the skis attached, however, it is possible to carry three such snowmobiles in the back of a standard size station wagon.

The snowmobile also employs a unique belt driving unit in which all of the drive and idler sprockets and rollers are carried by a pair of side frame plates which can be separated from the vehicle, if desired to facilitate repair. The unitary plate structure also assures accurate positioning of the various belt drive and supporting components.

The snowmobile also has other unique features which include the compact positioning of the engine and the fuel tank relative to the operator's seat.

It is, therefore a principal object of the invention to provide a compact snowmobile of simplified low-cost design.

Another object of the invention is to provide a snow vehicle designed primarily for children.

A further object of the invention is to provide a snowmobile having an improved supporting structure for the front skis.

Yet another object of the invention is to provide a snow vehicle with an improved belt driving and supporting arrangement.

Still a further object of the invention is to provide a snowmobile incorporating compact positioning of the engine and fuel tank.

Many other objects and advantages of the invention will be apparent from the following detailed description of a preferred embodiment thereof, reference being made to the accompanying drawings, in which:

FIG. 1 is a front perspective view of a snowmobile embodying the invention, with parts broken away;

FIG. 2 is a longitudinal view in vertical cross section of the snowmobile with a belt driving unit therefor shown in elevation;

FIG. 3 is a front view of the ski supportng structure taken along the line 3—3 of FIG. 2;

FIG. 4 is a rear view in perspective of the snowmobile with certain components omitted;

FIG. 5 is a view in longitudinal, horizontal cross section of the belt driving unit; and FIG. 6 is a view in transverse cross section taken along the line 6—6 of FIG. 2, and with certain parts omitted.

Referring to the drawings, a snowmobile or vehicle embodying the invention is indicated at 10 and includes a main frame 12 on which is supported an elongate body or channel-shaped seat support 14 with a front hood 16. A driving unit 18 is located at the rear of the snowmobile and a ski support 20 is located at the forward portion. The frame 12 preferably is constructed of lightweight, square tubular members with the body 14 constructed of thin glass fiber-reinforced plastic, and the hood being of thin vacuum-molded plastic or aluminum. This construction, along with the simplicity and relatively few components involved in the design, enables the vehicle to be of exceptionally light weight and easily carried by two adults. The low weight of the machine also increases the length of the belt life.

The frame 12 includes two main longitudinally-extending upper frame members 22 upon which a seat portion 24 of the body 14 rests (see FIG. 6). The seat 24 is long enough to accommodate one adult or two children. Because the seat 24 is supported directly on the frame members 22, the body 14 is sufficiently strong even though it is quite thin. Just outside the members 22, the body 14 extends downwardly in depending flanges 26 and then extends outwardly in horizontal flanges 28 (FIGS. 1 and 4). A forward portion of the body 14 is flared upwardly to form a dashboard or panel 30 and the forward portions of the flanges 28 also extend upwardly to form foot rests 32.

The lower portion of the hood 16 is under lower frame members 34 (FIG. 2) which extend downwardly and rearwardly from the front portion of the frame 12, with the hood affixed to the frame members 34 by fasteners 36. The hood 16 has a protective bar 38 extending therearound and a central opening 40 in which is mounted a grille 42 for cooling purposes. A fuel tank cap 44 which can also contain a gauge, if desired, is at the front end of the hood above the grille 42.

The ski assembly 20 includes skis 46 which can be of lightweight aluminum and have downwardly-extending V-shaped portions 48 (FIG. 3) which provide lateral stability for the skis. Also of importance is the fact the skis are mounted at angles to the horizontal so that the outer longitudinal edges of the skis are below the inner edges. This improves the directional control in the steering of the snowmobile since the outer edges tend to dig into the snow when turning. Thus, when turning left, the outer edge of the right ski tends to penetrate the surface of the snow more, and vice versa.

The skis are supported by a resilient strap 50 in the nature of a leaf spring, with a concave side facing downwardly, and with outer ends terminating in flanges 52. The flanges 52 are received between ears 54 suitably affixed to intermediate portions of the skis 46, as by riveting, and with pins 56 extending through openings in the ears and flanges to pivotally connect the skis and the resilient strap. The resilient strap 50 contributes to the comfort of the ride and enables the snowmobile to accommodate uneven terrain more effectively. Further, the skis can be quickly separated from the snowmobile by removing cotter pins in the pivot pins 56 and withdrawing the pins 56. This enables the length of the snowmobile to be shortened by the extent to which the skis extend beyond the front of the hood 16, to facilitate transportation and storage. The skis also can be removed easily to facilitate repair or replacement, if necessary.

A reinforcing strap 58 is located above the resilient strap 50 although the additional strap may not be essential in many instances. A vertical steering post 60 is affixed to the straps 50 and 58 through a mounting plate 62. The steering post 60 extends upwardly through a bearing sleeve 64 which is mounted between two cross struts 66 and 68 (FIG. 1) of the frame 12. A steering rod 70 is received in the upper end of the steering post 60 and is connected thereto by a tapered bolt 72 (FIG. 2) and a nut 74. The tapered bolt 72 connects the post and steering rod tightly so that no play can occur therebetween. A handle bar 76 is affixed to the upper end of the steering rod 70 and terminates in handles 78. The steering structure for the ski assembly thereby is of simple and maintenance-free design with relatively few parts involved.

Referring now to the drive unit 18, all of the components thereof are mounted between a pair of side plate members 80 and 82 (FIG. 5) which are of stamped sheet metal so as to be both inexpensive and light in weight. The plate members are formed to receive the various shafts and axles of the drive unit in predetermined positions so that there is no problem of alignment of the components as has heretofore occurred when the shafts and axles were mounted directly on the frame. The plate members 80 and 82 are connected by welded cross struts 84 and 86 (FIG. 2) located between upper edges of the plates with a third cross strut 88 (FIG. 6 also) affixed to the upper edges of the plates and extending therebeyond. An L-shaped cross strut 90 (FIG. 2) is affixed to extensions 92 at the lower edges of the plate members to serve as a structural support between the members and also to act as stops, as will be discussed subsequently.

The drive unit is separate and separable from the main frame 12 with the cross strut 88 being affixed to the longitudinal frame member 22 by fasteners 94. The front lower edges of the plate members 80 and 82 are affixed to the rear ends of the lower frame members 34 by fasteners 96 and the rear edges of the plate members have flanges 98 which are bolted to a U-shaped back rest 100 by fasteners 102. The back rest 100 also has a cross bar 104 which is affixed to the rear ends of the longitudinal frame members 22 by suitable brackets (not shown). By removing the five fasteners 94, 96, and 102, the drive unit 18 can be removed from the vehicle.

A wide, flexible drive belt 106 is located between the plates 80 and 82. The rear end of the belt is supported by idler wheels 108 and an idler sprocket 110 which are mounted on a shaft or axle 112. The shaft 112 is received in notches 114 at the rear of the plate members, being held therein by take-up bolts 116 which extend through the flanges 98 and the lower end portions of the back rest 100. The bolts 116 represent a simple but effective means for supporting the shaft 112 and for providing proper tension for the belt 106. At the forward end of the belt 106, supporting rollers 118 and a drive sprocket 120 are mounted on a drive shaft 122. The shaft 122 is supported in bearing blocks 124 and 126 located in openings or notches 128 and 130 in the plate members 80 and 82, being fastened by bolts 132. The sprockets 110 and 120 are engaged in a row of square openings 134 in the belt 106, as shown in FIG. 5.

At an intermediate point on the lower run of the belt 106, a plurality of supporting discs 136 and 138 are rotatably mounted on arms 140 and 142 which are pivotally mounted on a central supporting shaft or axle 144. The shaft 144 extends through openings 146 (FIG. 4) in the plate members 80 and 82 and is held by split rings (not shown). Coil springs 148 are located on the shaft 144 between each pair of the oppositely-extending arms 140 and 142, urging the arms constantly in a downward direction. However, the limit of downward movement of the arms 142 is determined by the long side of the L-shaped strut 90 while the limit of downward movement of the arms 140 is determined by the upper edge of the strut 90. The discs 136 and 138 thereby yieldably position the belt so that a forward portion thereof slants at the proper angle. The angle is important to enable the belt to ride properly on the snow.

The drive unit is designed so that it is possible to replace the belt 106 by removing the bearing blocks 124 and 126, the shaft 144, the cross strut 90, and the take-up bolts 116 for the shaft 112.

The drive shaft 122 is driven by an engine 150 (FIG. 2) mounted on a vertical supporting base 151, with a portion of the engine being directly under a forward portion of the seat 24. The engine has a horizontal drive shaft 152 positioned transversely of the vehicle and a cylinder 154 extending forwardly toward the grille 42 so that a spark plug can be reached through the grille. By way of specific example, a three to five horsepower, two-cycle engine can be used. With this position of the engine, only a small fraction thereof projects above the level of the main longitudinal frame members 22, which enables the center of gravity of the snow vehicle to be located close to the ground and, in particular, enables the vehicle to be compact lengthwise as much as possible.

A throttle cable 156 connects a carburetor, positioned on the upper side of the engine, to a throttle handle 158 located on one of the handle bar handles 78 to control the speed of the engine. A centrifugal clutch 160 is mounted on the drive shaft 152 and slips relative thereto when the engine is idling. When the engine reaches a predetermined speed, the clutch 160 connects the drive shaft 152 with a drive sprocket 162 which drives a large intermediate sprocket 164 through a chain 166. A second intermediate sprocket 168, both of which are mounted on a stub shaft 170, rotates a driven sprocket 172 on the drive shaft 122 through a chain 174. The shaft 170 can be mounted in the side plate member 80 to maintain a fixed distance between the sprockets 168 and 172.

The throttle handle 158 is the only control needed to operate the engine and the drive unit 18. When the engine is idling, the vehicle is stationary whereas when the handle 158 is squeezed, to increase the speed of the engine, the centrifugal clutch 160 then causes the belt 106 to be driven by means of the sprockets and chains. In the event that the operator should fall off the snowmobile, the throttle handle 158 returns to its normal idle position and the clutch 160 becomes disengaged, with the vehicle then stopping almost immediately. As shown in FIG. 4, the only controls on the panel 30 are an ignition key lock 176, a choke 178, and a starting cord 180. This provides utmost simplicity in the engine controls.

A partition 182 extends diagonally across the vehicle between the engine 150 and the drive shaft 122 in order to protect the engine from snow. This is particularly important because of the close proximity of the engine to the forward end of the belt 106. The partition, as shown, can be affixed to an upper cross strut 184 and to a lower cross strut 186 which also extends beyond the main frame and specifically beyond the lower frame members 34 to provide support for the flange portion 28 of the body 14.

With the compact arrangement of the snowmobile, the engine 150 occupies substantially all of the space between the bearing sleeve 64 and the belt drive shaft 122. A fuel tank 188, consequently, is located in front of the bearing sleeve 64, mounted on the cross bar 68 and a forward cross support 190. The tank can be held by a suitable strap 192 extending around the tank and the front cross support 190. A filler spout 194 of the tank projects through the hood 16 and terminates in the cap 44. The tank thus can be easily filled from the front of the vehicle and in the event fuel is spilled, as is frequently the case, it will not fall on a hot engine and result in a dangerous condition.

From the above, it will be seen that the snowmobile 10 is simple, inexpensive, and relatively maintenance-free. The arrangement and design of the components enable the vehicle to be extremely compact and also light in weight.

Various modifications of the above described embodiment of the invention will be apparent to those skilled in the art, and it is to be understood that such modifications can be made without departing from the scope of the invention.

I claim:

1. A snow vehicle comprising a frame, a drive unit for said vehicle comprising a pair of side plates spaced apart a predetermined distance, in parallel relationship, by cross members, means attaching end portions of said side plates to said frame to further aid in supporting said plates in their predetermined relationship, each of said plates having a forward opening, a first shaft extending between said openings of said plates and rotatably supported through said side plates, said shaft having a drive sprocket thereon, each of said plates having an opening at a lower rear edge portion thereof, a second shaft extending between said plates and extending through said second openings, an idler sprocket mounted for rotation on said second shaft, a central shaft located between said first and second shafts and parallel thereto, end portions of said central shaft being supported by intermediate portions of said side plates, supporting rollers mounted on arms which are pivotally carried by said central shaft, resilient means associated with said arms and said central shaft for urging said arms in a downward direction, a stop bar extending between said side plates below said central shaft and parallel thereto for limiting the extent of downward movement of said arms, and a belt extending around said sprockets and supported at an intermediate portion by said supporting rollers.

2. A snow vehicle comprising a frame, a drive unit for said vehicle comprising a pair of side plates spaced apart a predetermined distance by cross members, means attaching end portions of said side plates to said frame to further aid in supporting said plates in predetermined relationship, each of said side plates having forward openings, a first shaft extending between said openings of said plates and rotatably supported through said side plates, said shaft having a drive sprocket thereon, each of said side plates having an opening at a lower rear edge portion thereof in the form of an elongate notch extending generally in a direction toward said forward openings and opening toward said forward openings, a second shaft extending between said plates and extending through said elongate notches, an idler member mounted for rotation on said second shaft, a central shaft located between said first and second shafts and parallel thereto, end portions of said central shaft being supported by intermediate portions of said side plates, supporting means resiliently carried by said central shaft, a belt extending around said drive sprocket and said idler member, and supported at an intermediate portion by said supporting means, and adjustable means connected to end portions of said second shaft beyond the edges of said belt and effective to change the position of said second shaft in said elongate notches and to adjust the tension on said belt.

3. A unitary snow vehicle comprising an elongate frame, a body including a generally horizontally-extending channel-shaped seat support extending over a substantial portion of the length of said frame, an engine supported by a front portion of said frame with a major portion of said engine located below the level of and disposed substantially within said channel-shaped seat support, said engine having a horizontal drive shaft extending toward one side of said frame, drive means carried by said frame at a rear portion of said vehicle and permanently supported in fixed relationship with respect to said engine, means connecting said drive shaft and said drive means, and a partition extending across said vehicle between said drive means and said engine to protect said engine from snow.

4. A vehicle according to claim 3 characterized further by an upright bearing sleeve carried by said frame immediately in front of said engine, and steering means rotatably mounted in said bearing sleeve for guiding said vehicle.

5. A vehicle according to claim 4 characterized by a fuel tank supported on said frame in front of said bearing sleeve.

References Cited

UNITED STATES PATENTS

| 2,323,526 | 7/1943 | Eliason. | |
| 2,528,890 | 11/1950 | Lawrence | 180—5 |
| 2,970,662 | 2/1961 | Hetteen | 180—5 |
| 3,011,576 | 12/1961 | Howes | 180—5 |
| 3,309,150 | 3/1967 | Marier | 180—5 |
| 3,362,492 | 1/1968 | Hansen | 180—5 |
| 3,404,745 | 10/1968 | Smieja | 180—5 |

FOREIGN PATENTS 230,824 5/1944 Switzerland.

OTHER REFERENCES

Adirondack Home News, p. 21, Feb. 8, 1967.
Popular Mechanics, October 1967, pp. 138–141.

RICHARD J. JOHNSON, Primary Examiner

U.S. Cl. X.R.

280—21